United States Patent
Perks

[15] 3,683,993
[45] Aug. 15, 1972

[54] OPENING ROOF FOR VEHICLE

[72] Inventor: Joseph Perks, 57 Gorleston Road, Birmingham, 14, England

[22] Filed: Sept. 22, 1970

[21] Appl. No.: 74,453

[52] U.S. Cl. ......... 160/37, 292/DIG. 5, 292/DIG. 31, 296/137 H
[51] Int. Cl. .............................................. B60j 7/04
[58] Field of Search ................. 160/37; 49/449, 460; 292/DIG. 5, DIG. 31; 296/137, 137 D, 137 H, 137 E

[56] References Cited

UNITED STATES PATENTS

| | | | |
|---|---|---|---|
| 3,148,913 | 9/1964 | Golde | 292/DIG. 31 |
| 3,002,785 | 10/1961 | Larche | 292/DIG. 5 |

FOREIGN PATENTS OR APPLICATIONS

| | | | |
|---|---|---|---|
| 1,114,099 | 9/1961 | Germany | 296/137 H |
| 646,334 | 11/1950 | Great Britain | 292/DIG. 5 |

*Primary Examiner*—J. Karl Bell
*Attorney*—Scrivener, Parker, Scrivener & Clarke

[57] ABSTRACT

In an opening roof for a vehicle a handle for operating locking means is located within a recess in a front sliding cross-chamber of the roof. In an inoperative position the handle is received within the depth of the cross-member. The handle is movable manually about a pivotal connection against the loading of a return spring downwardly into an operative position, whereafter the locking means can be operated.

4 Claims, 6 Drawing Figures

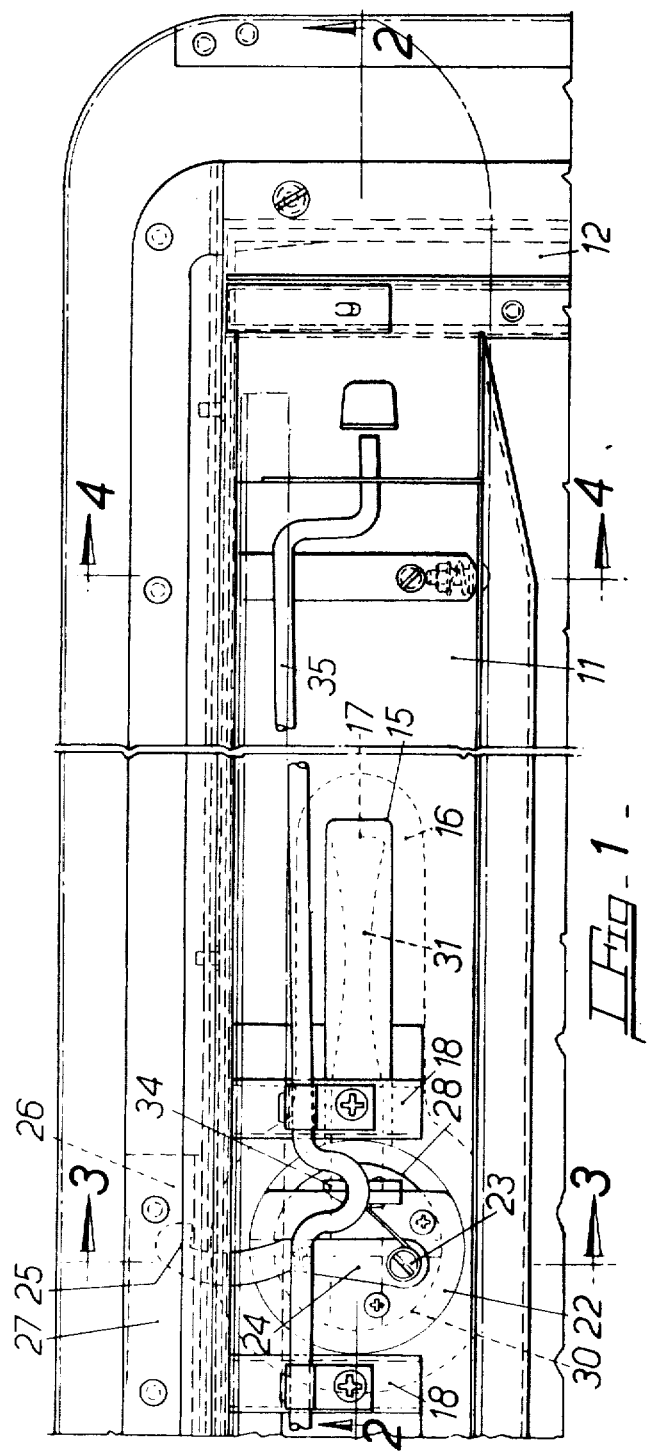

PATENTED AUG 15 1972 3,683,993

OPENING ROOF FOR VEHICLE

SPECIFIC DESCRIPTION

This invention relates to opening roofs for vehicles such as saloon cars of the kind in which a longitudinal opening in the roof is provided with a flexible fabric or like covering supported by cross-members adapted to slide on guides extending along each side of the opening, and the front sliding cross-member incorporates handle-operated locking means for engagement with a co-operating part of the roof at the front end of the opening to draw the front cross-member forwardly to tighten the fabric cover and draw it down into close contact with the surface of the roof around the opening.

In opening roofs of this kind the handle for operating the locking means projects below the lower face of the front cross member and below the head lining of the vehicle roof.

Due to a recent legislation in the United States of America it is now a requirement that projections of that kind are removed from the interior of a vehicle, and it is the object of this invention to provide improved handle-operated locking means in which the handle is concealed when it is not being used for operating the locking means.

According to our invention, in an opening roof of the kind set forth the front sliding cross-member incorporates in its lowermost surface a recess in which the handle is adapted to be received in an inoperative position and the handle is pivotally connected at one end to the lowermost end of a boss which is rotatable to effect operation of the locking means, spring means holding the handle in the recess in the inoperative position in which it lies above or substantially flush with the lowermost surface of the cross-member, and the handle being manually movable angularly about the pivotal connection as an axis in a downward direction and into an operative position against the loading of the spring means whereby the boss can be rotated.

This has the advantage that the handle is received within the depth of the cross-member except on the occasion when it is desired to open or close the roof.

The spring loading ensures that the handle is automatically returned to the inoperative position within the recess upon termination of each opening or closing movement of the roof.

One embodiment of our invention is illustrated in the accompanying drawings in which:

FIG. 1 is a plan of a part of the front portion of an opening roof as applied to a saloon car;

Figure 6:
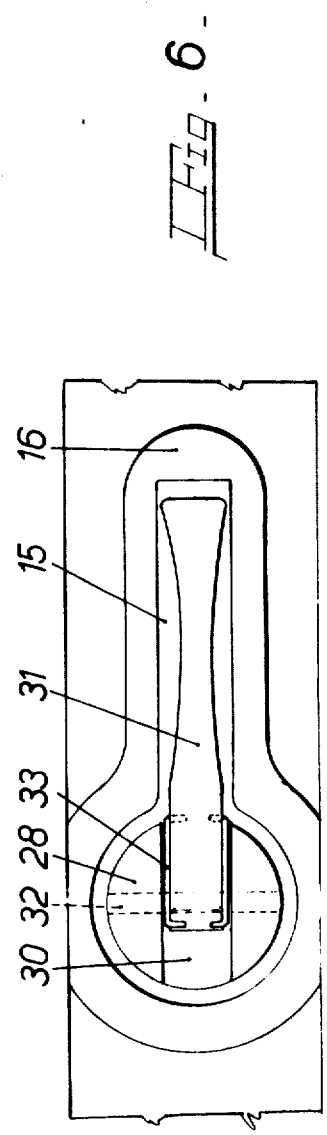
FIG. 6 is an inverted plan view of a portion of the cross member shown in FIG. 1 showing the handle.
Figure 2:
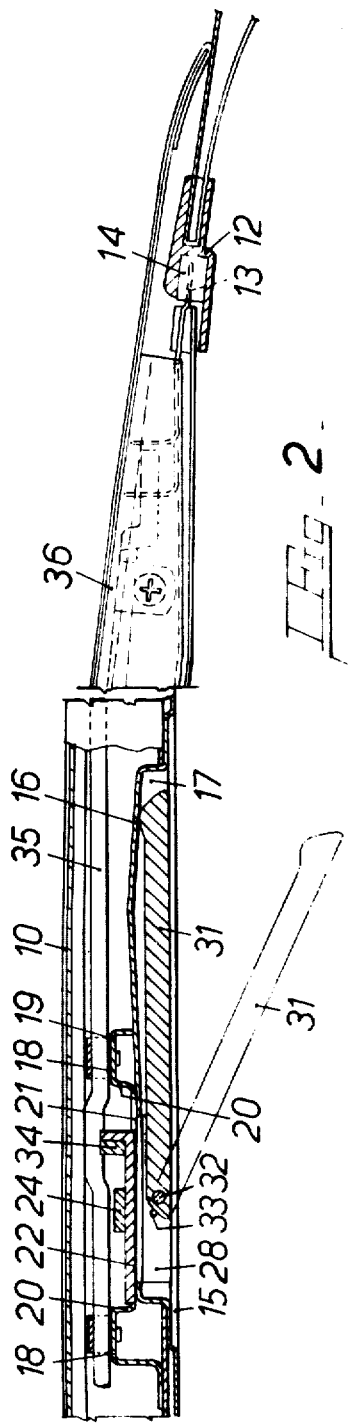
FIG. 2 is an end elevation of the front cross-member including a fragmentary section on the line 2—2 of FIG. 1.
Figure 3:
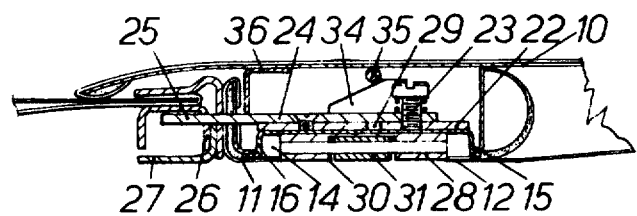
FIG. 3 is a section on the line 3—3 of FIG. 1.
Figure 4:
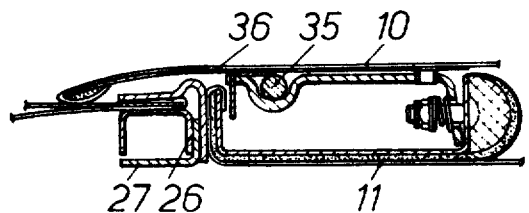
FIG. 4 is a section on the line 4—4 of FIG. 1.
Figure 5:
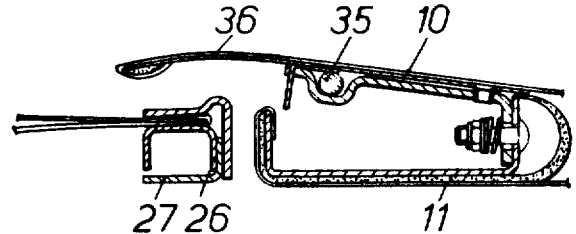
FIG. 5 is a view similar to FIG. 4 but showing a flap secured to the cross-member in a raised position.

In the opening roof illustrated, the opening in the roof, of which only the front portion is shown, is rectangular and extends for substantially the full length of the roof. The opening is provided with a flexible fabric covering 10 which is supported by a series of cross-members of which only the front cross-member 11 is shown.

The front cross-member 11 comprises a channel-section member conveniently a pressing which is slidably guided on flanges or runners 12 at each side of the roof opening by means of sliders 13 lined with felt or other suitable material 14 which are of substantial length in a fore and aft direction to maintain the cross-member at right angles to the guide.

The channel section pressing 11 is formed with a central circular opening which is elongated transversely in one direction to form a slot 15 of substantially key-hole outline. The lower end of a depending wall of a metal pressing 16 of a complementary outline is welded to the material of the channel section pressing 11 surrounding the slot 15 to provide the channel section pressing 11 with an inwardly projecting recess 17.

The portion of the pressing 16 of key-hole outline which overlies the central circular opening is surrounded by a pair of spaced longitudinally extending flanges 18 of a central mounting bracket 19 which are also welded to the channel section pressing 11. The flanges 18 are continuous with a pair of vertical side flanges 20 which, at their free ends, lead into a bridge portion provided with a central aperture 21 in which is located a disc 22 carrying an eccentrically mounted peg 23. A hook member 24 is pivotally connected at its rear end on the peg 23 and at its front end has a nose 25 for engagement in a keeper 26 in a fixed cross-member 27 of the front end of the opening.

A boss 28 in the form of a nylon hub is located in the circular portion of the pressing 16 of key-hole outline and is keyed to the disc 22 by a short spindle 29 passing through a central opening in the circular portion of that pressing 16. The nylon hub 28 is formed in its lowermost surface with a diametrically extending open-ended slot 30 in which the inner end of an operating handle 31 is received, and the handle 31 is pivotally connected to the hub by a pivot pin 32 parallel to the plane of the channel section pressing. A pair of torsion return springs 33 act between the pivot pin 32 and the handle 31 in a direction such that the handle 31 is normally held within the recess 17 defined by the key-hole pressing.

When it is desired to rotate the disc 22 to draw the slidable cross-member 11 of channel section towards the fixed cross-member 27, the handle 31 is first moved manually about the pivot pin 33 as an axis, and is then rotated to effect rotation of the disc 22. When released the handle 31 is returned automatically to an inoperative position in which it is received within the recess 17 by the action of return springs 33.

Thus, in the inoperative position the handle 31 is at all times received within the depth of the cross-member 11 and there are no parts of the handle which project below the lower surface of the cross member and could be contacted by a part of a person travelling in the vehicle in the event of an accident or an emergency stop.

The disc 22 may be provided on its upper surface with a wedge or cam 34 to effect rotation of a torsion bar 35 for urging a pivotally mounted flap 36 mounted on the channel section pressing 11 into engagement with the fixed cross-member 27 of the vehicle when the handle is rotated. This feature forms the subject of our British Pat. No. 989,694 and need not be further described herein.

I claim:

1. In an opening roof for a vehicle having an longitudinal roof opening comprising a fabric covering, a front cross-member and at least one second cross-member for supporting said covering and adapted to slide on guides extending along each side of the opening, and handle-operated locking means incorporated in said front-cross-member for engagement with a co-operating part of the roof at the front end of the opening to tighten said fabric covering and draw said covering down into close contact with the surface of the roof surrounding the opening, the invention wherein said front cross-member incorporates in the lowermost surface thereof a recess in which said handle is located, a boss rotatable to effect operation of said locking means and disposed wholly within said recess with no part of said boss projecting below said front cross-member, a pivotal connection between said boss and said handle, and spring means for supplying to said handle a force urging said handle wholly into said recess in a first inoperative position in which said handle is at least flush with said lowermost surface of said front sliding cross-member and no part of said handle projects below said front cross member, said handle being manually movable angularly about said pivotal connection as an axis in a downward direction into a second operative position against said force of said spring means, whereafter said boss can be rotated.

2. The invention as claimed in claim 1, wherein said front sliding cross-member is formed with a central circular opening which is elongated transversely and a member of an outline complementary to the shape of the elongated opening and having a lower end secured to the material of said cross-member surrounding said elongated opening at said lower end to define, in said front sliding cross-member, an inwardly projecting recess in which said handle is received in said first inoperative position.

3. An opening roof as claimed in claim 1, wherein said boss is formed with an open-ended diametrically extending slot in which one end of said handle is received, and said one end of said handle is pivotally connected to said boss by means of a pivot pin normal to the axis of said slot and located in a plane parallel with the plane of said cross-member.

4. An opening roof as claimed in claim 3 wherein said spring means comprises a pair of elongated return springs acting between said pivot pin and said handle in a direction to urge the handle into said first operative position, at least when said handle is superimposed over said recess.

* * * * *